United States Patent
Axelsson

[15] 3,660,902
[45] *May 9, 1972

[54] APPARATUS FOR CLEANING OR POLISHING OF TEETH

[72] Inventor: Per A. T. Axelsson, Drottninggatan 27, Karlstad, Sweden

[*] Notice: The portion of the term of this patent subsequent to Jan. 5, 1988, has been disclaimed.

[22] Filed: Apr. 24, 1970
[21] Appl. No.: 31,564

[52] U.S. Cl. ..........................................32/58
[51] Int. Cl. ......................................A61c 3/06
[58] Field of Search ........................32/50, 40, 58

[56] References Cited

UNITED STATES PATENTS 3,552,022   1/1971   Axelsson.....................................32/58
1,039,235   9/1912   Wiggins.......................................32/58
2,016,597   10/1935  Drake.......................................32/58 X

*Primary Examiner*—Robert Peshock
*Attorney*—Cushman, Darby & Cushman

[57] ABSTRACT

A dental apparatus for home care of teeth is disclosed. The apparatus comprises a wedge-like and pointed tool adapted for insertion into teeth interstices for cleaning the approximate teeth faces, and a handle whereby the tool can be easily operated. A stem of the tool is held with friction grip by a socket inserted transversely through the end of the handle and completely free to turn about its axis so that the tool by itself adjusts its angular position to the teeth faces being cleaned.

9 Claims, 10 Drawing Figures

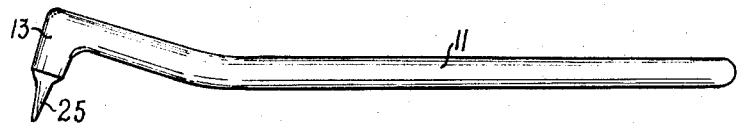
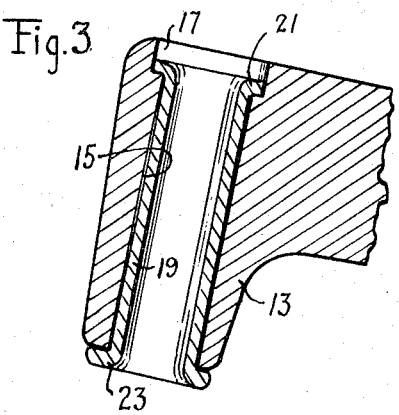
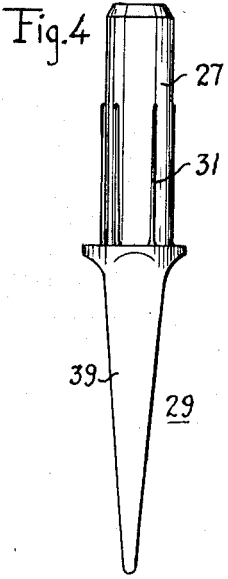
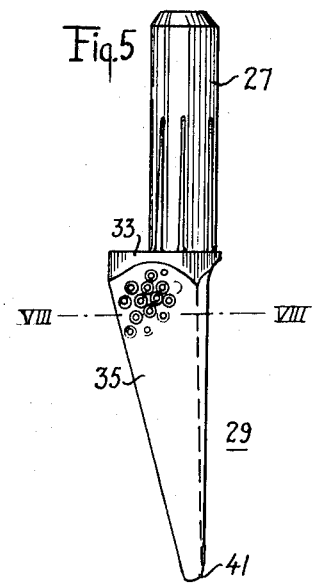
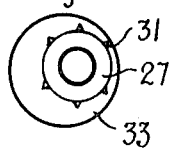
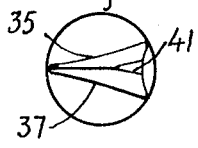
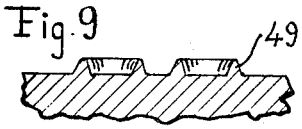
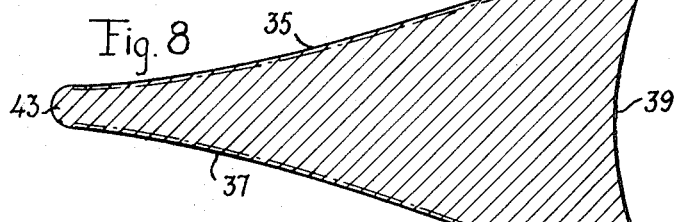
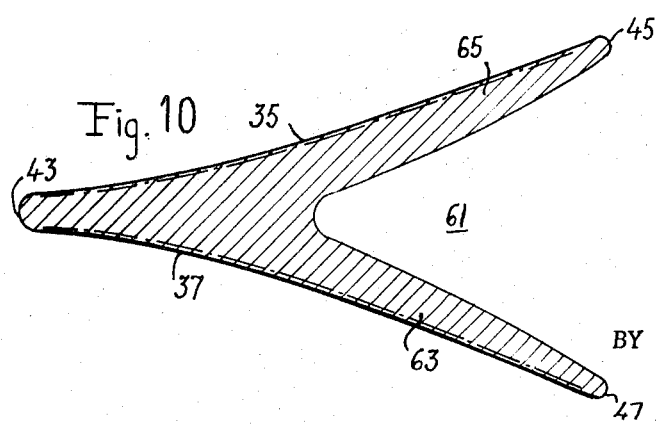

APPARATUS FOR CLEANING OR POLISHING OF TEETH

This invention relates to an apparatus for cleaning or polishing teeth.

With usual teeth brushes it is impossible to clean satisfactorily the tooth faces adjacent to the teeth interstices and to remove coatings of bacteria therefrom, and this is a basic requirement for the prevention of gum inflammation and loosening of teeth (paradontopati). Also, if said coatings are not removed regularly, tartar is also formed and this can only be removed by a dentist. Therefore, it is desirable that brushing of the teeth be completed with a daily cleaning of the teeth interstices.

An object of the present invention is to provide an apparatus suitable for home use, whereby such cleaning can be efficiently performed.

According to the present invention, there is provided an apparatus for cleaning or polishing adjacent faces of the teeth of a patient, comprising a pointed tool dimensioned for insertion into and through teeth interstices and having opposite rough or abrading faces, said tool being held in a socket at an end part of a handle so that the axis of the tool is transverse to the length of the handle, and said tool being free to turn about its own axis whereby, during insertion into and working in the teeth interstices, the tool can turn relatively to the handle to adopt an angular position which is correct for the action of the tool faces against the teeth faces.

Preferably, said tool faces are set at an acute angle to one another.

Preferably also, said tool is frictionally held in a rotary socket member carried by said handle.

The present invention also provides a pointed tool as defined above.

As a result of the invention the teeth interstices can easily be reached from the outer (cheek) side as well as from the inner (tongue) side, and a cleaning effect much better than by the use of a tooth pick can be obtained.

An embodiment of the invention will now be described, by way of example, with reference to the accompanying drawings in which:

FIGS. 1 and 2 are side views from two different angles of an apparatus for cleaning or polishing teeth;

FIG. 3 is a cross-sectional view, on an enlarged scale, of a head forming part of the apparatus;

FIGS. 4 and 5 are views, from two sides at right angles to one another, showing a pointed tool, on the same enlarged scale;

FIGS. 6 and 7 show the tool from opposite ends;

FIG. 8 is a cross-section on the line VIII—VIII of FIG. 5, on an even larger scale;

FIG. 9 shows a detail of the working face of the tool;

FIG. 10 is a cross-section through a modified form of tool.

Referring to the drawings, the apparatus, which is shown full size in FIGS. 1 and 2, comprises a longish flattened handle 11 similar to the handle of a conventional tooth brush. At its front end, the handle is formed with an integral head or boss 13 which projects transversely to the length of the handle on one side thereof. Said boss has a through cylindrical hole 15 extending at approximately right angles to the adjacent portion of the handle, and one end of said hole is enlarged at 17. Inserted into said cylindrical hole, with suitable play, is a socket member 19 in the shape of a tubular metal sleeve. The ends of the sleeve are widened, for example by peening over, so as to form collars or annular flanges 21 and 23 which abut against the body of the handle from opposite sides so as to retain sleeve against withdrawal. Due to its manner of attachment, the socket member is free to turn on its own axis. The flange 21 is recessed in the enlarged part 17 of the hole 15 so that it cannot contact the user's teeth and, during use of the apparatus, the flange 23 at the other end is covered by tool 25 which is inserted in the socket member.

The tool, which is shown in FIGS. 4 to 7 on the scale 5:1, consists of a shank portion 27 and a working portion 29. The shank portion 27 is generally cylindrical and provides for the removable attachment of the handle. The shank is shaped to fit into the socket member sufficiently tightly to retain the tool during operation, but to allow removal of the tool at will by merely pulling out the tool. In order to promote a good frictional grip, the cylindrical face of the shank is formed with a number of axially extending ridges 31 having heights which increase towards the working portion of the tool. A shoulder 33 providing a flat annular face eccentric to the shank is arranged to abut the flange 23 and determine the correct end position when the tool is being inserted into the handle.

The working portion 29 of the tool is designed for insertion into the teeth interstices and for cleaning or polishing of the adjacent teeth faces during reciprocating movement of the tool in the direction of its own length. Said teeth faces are convex and the interstices widen in the horizontal direction, i.e. towards the cheek and the tongue, as well as in the vertical direction towards the gum where the boundary of the interstice is formed by a convex papilla of the gum. To correspond with said shape of the teeth interstice, the tool according to the invention is wedge-shaped and pointed very much like the tip of a dagger. Two symmetrical working side faces 35 and 37 form an acute angle of about 20 to 40 degrees to each other and these faces are convex and of a rough or abrasive nature, whereas narrow back side 39 is concave and smooth in order to avoid injury to gum papilla. The tool tapers towards its point 41, and its triangular cross-sections are similar over the main part of its length and decrease evenly in size; edges 43, 45 and 47 are straight. However, at the outermost end portion the back side 39 curves inwardly towards the sharp edge 43, so that the tip of the tool is blunted. Due thereto the insertion of the tool into the teeth interstices is facilitated and the risk of damaging the gum papilla is reduced. The shape of the cross-section is clearly shown in FIG. 8, on a scale of 30:1. The desired roughness of the side faces 35 and 37 can be obtained by forming therein a large number of closely arranged, small ridges 49 of triangular cross-section which enclose small depressed areas of the tool face, whereby polishing paste or the like can be retained. Preferably and as shown in FIGS. 5 and 9, the ridges are annular in shape and may be of a diameter of about 0.014 inch and a height of about 0.004 inch. The peaks of the ridges will have an abrading effect of their own, particularly when the material of the tool is chosen for this purpose. Usually, the tools will be made from thermoplastic material of such a kind that the tools can be moulded to the desired shape in a single operation. The material should be resilient so that the tool can be slightly bent but it should have a sufficient stiffness to ensure that the tool can be pushed into a narrow teeth interstice without collapsing.

In order to be able to polish teeth with differently shaped interstices it is desirable to have a set of tools of different sizes and shapes. The fit between the socket 19 and the tool stem 27 enables easy exchange of tools.

The form of tool shown in FIG. 10 is a modification of the form shown in FIGS. 4 to 8, in that the inoperative back side of the tool is hollowed out so as to form a deep furrow or cleft 61 that extends from the back side at least half-way to the edge 43. Thus, the cross-section of the tool is essentially V-shaped, and on opposite sides of said cleft there are diverging thin flaps 63 and 65 whose thickness gradually decreases towards the free edges 45 and 47. Said flaps are flexible and resilient, so that, when the tool is used, the flaps move towards each other and the angle formed by their outer faces is diminished more or less according to the shape of the interstice between the teeth being cleaned. Due to their resiliency, the flaps will also exert a controlled pressure against the teeth faces. Another important advantage of this configuration is that the tool adapts itself to teeth interstices of different shapes and sizes, thus forming a universal tool that can be used for all or most of the teeth interstices of the mouth, so that tool changes may not be required at all or so often as with the forms of tool previously described.

I claim:

1. An apparatus for cleaning adjacent surface portions of teeth comprising a pointed tool dimensioned for insertion between teeth interstices and having generally oppositely facing abrading surfaces, an elongated handle having a substantially cylindrical bore at one end extending through said handle, the longitudinal axis of said bore being generally transverse to the length of said handle, said bore having a hollow tubular socket member disposed therein, said socket member being rotatable in said bore about its longitudinal axis and said tool having a shank portion frictionally engaged in said socket member so that, when said tool is inserted into and is moved relative to the teeth interstices, said tool will rotate relative to said handle to bring said abrading surfaces into contact with adjacent teeth surfaces.

2. An apparatus as claimed in claim 1, in which said tool faces are set at an acute angle to one another.

3. An apparatus as claimed in claim 1, in which said socket member is sleeve-shaped and accommodated with slight play in said cylindrical bore extending through an eccentric head integral with the end portion of the handle, the ends of the socket member being formed with annular flanges which abut against opposite faces of the head to prevent withdrawal of the socket member.

4. An apparatus as claimed in claim 1 wherein said shank portion is generally cylindrical and provided on its exterior surface with axial ridges which gradually increase in height toward said abrading surfaces of said tool.

5. An apparatus as claimed in claim 1 in which the tool is substantially triangular in crosssection, two similar rough working faces being set at an angle of 30° to 40° to one another and the third face forming a smooth back of the tool, the cross-sections of the tool being substantially similar and of sizes decreasing towards the tip of the tool.

6. A dental cleaning tool comprising a substantially cylindrical stem portion and a wedge-like and pointed operating end portion integral with said stem portion and having a narrow back face and two broad side faces, the latter meeting along a sharp substantially straight edge extending from the point of said end portion to said stem portion, said side faces being rough and said back face being smooth, and said back face being curved towards said sharp edge whereby the point of the tool is blunted.

7. A dental cleaning tool comprising a substantially cylindrical stem portion and a wedge-like and pointed operating end portion integral with said stem portion and having a narrow base face and two side faces broader relative to said base faces, said side faces meeting at an angle of 20° to 40° along a sharp edge extending from the point of said end portion to said stem portion, said base being concave and smooth and said side faces being provided with a plurality of ridges of substantially triangular cross-section forming walls completely surrounding depressed areas in said side faces.

8. A dental tool as claimed in claim 7, wherein said ridges are annular so as to enclose circular depressed areas.

9. A dental cleaning tool comprising an elongated stem portion and a wedge-like pointed working portion integral with said stem portion and having two similar rough working faces set at an angle of 20° to 40° to one another and forming a sharp edge extending from the point of said working portion to said stem portion and a back face forming a deep furrow between said rough working faces and extending from their remote parts at least half-way to said sharp edge and along the major part of the length of said working portion, the diverging portions of said working faces located opposite said furrow being resiliently deformable in order to adapt themselves to varying shapes of teeth interstices.

* * * * *